June 5, 1928.
A. TAUB
1,672,182
BRAKE EQUALIZING DEVICE
Filed May 16, 1923
2 Sheets-Sheet 1
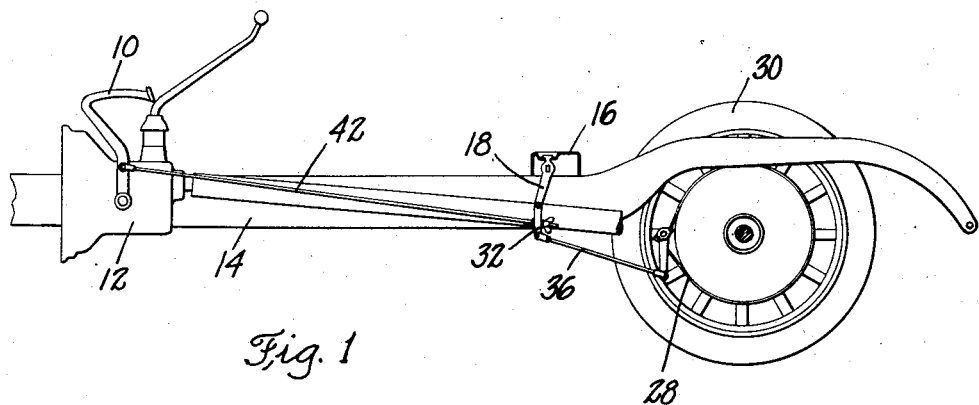
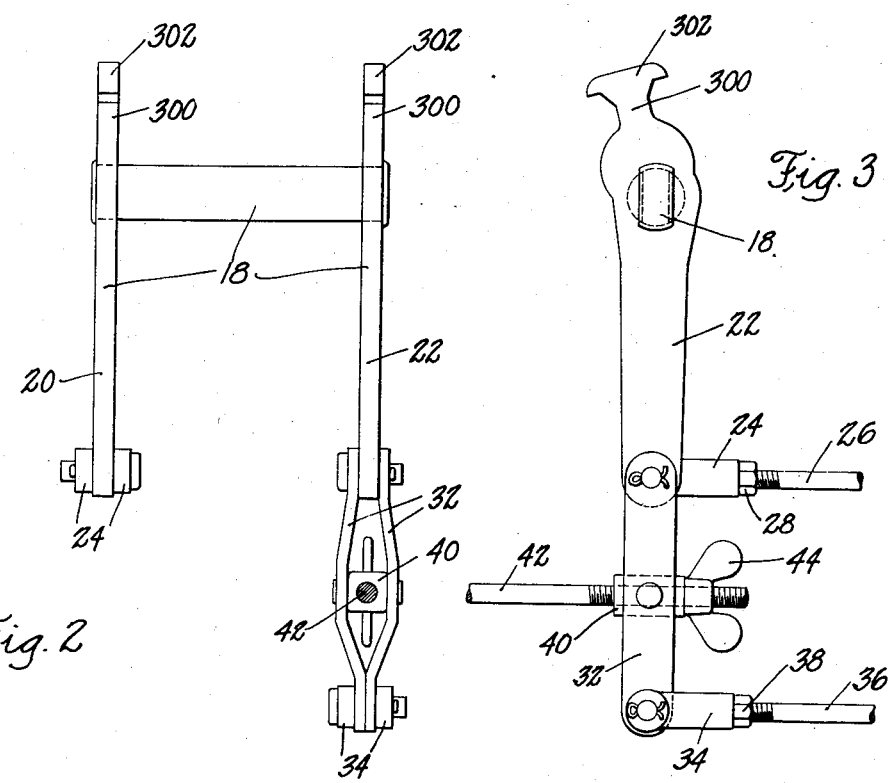
Inventor
ALEX TAUB
By his Attorneys
Blackmore, Spencer & Flint

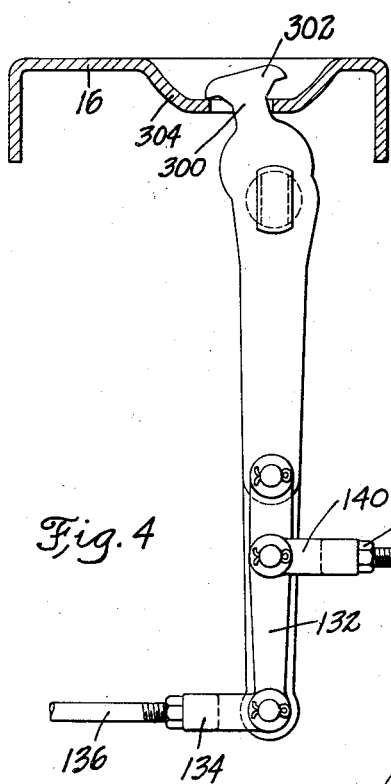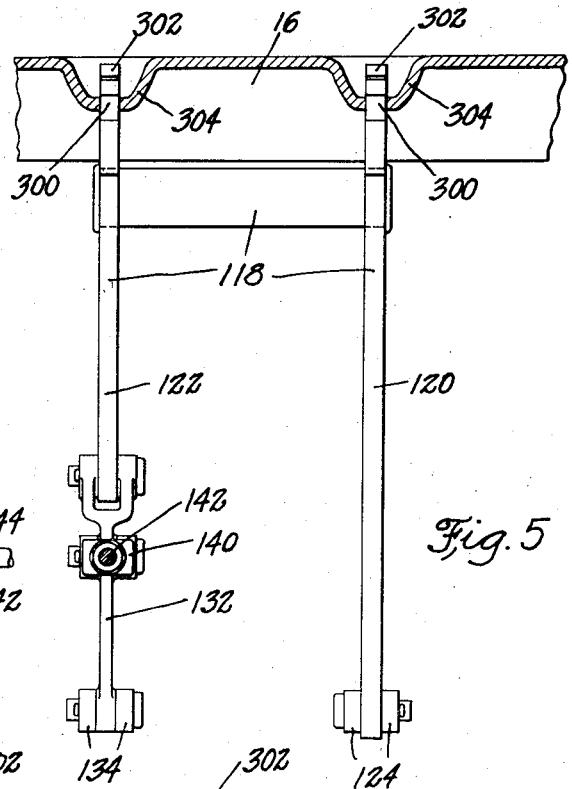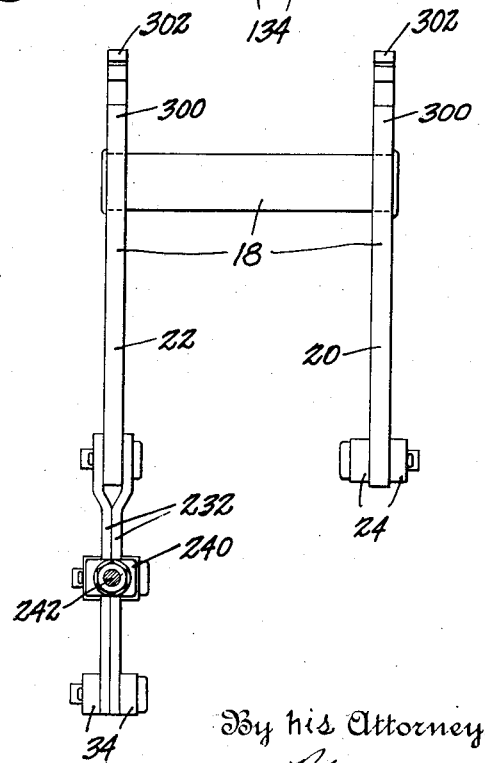

Patented June 5, 1928.

1,672,182

UNITED STATES PATENT OFFICE.

ALEX TAUB, OF DETROIT, MICHIGAN, ASSIGNOR TO GENERAL MOTORS CORPORATION, OF DETROIT, MICHIGAN, A CORPORATION OF DELAWARE.

BRAKE-EQUALIZING DEVICE.

Application filed May 16, 1923. Serial No. 639,416.

This invention relates to connections for operating brakes and is illustrated as embodied in connections from the brake pedal, or an equivalent controlling device, to a set of rear wheel brakes on an automobile.

An object of the invention is to secure an efficient set of connections including a simple form of equalizer, which can be very quickly assembled on the car. From this point of view the invention contemplates the use of a member having a pair of arms one of which is connected to one of the brakes and the other of which is directly connected to an equalizer such as a link which may be connected at its opposite end to another brake and at an intermediate point to the pedal or other brake controlling device. When equal pressure is desired on each of the brakes, the ratio of the lengths of the parts of the equalizing link above and below the connection to the pedal should be equal to the ratio of the lengths of the two arms. In the accompanying drawings I illustrate different modifications, in one of which the arms are of equal lengths and the connection to the pedal is accordingly secured to the link at its center, and in another of which the arms are of unequal lengths and the connection to the pedal is secured to the link at a corresponding point at one side of the center.

Other features of the invention relate to a novel method of supporting a brake operating connection such as the one described by forming heads on the upper ends of the arms adapted to be passed through openings in a cross piece of the chassis frame, to novel means of adjusting the connections, and to other novel combinations and desirable particular constructions of parts which will be apparent from the following description of several illustrative embodiments of the invention shown in the accompanying drawings, in which:

Figure 1 is a diagrammatic view of part of an automobile, some of the parts being shown in side elevation and others in longitudinal vertical section;

Figure 2 is a front elevation of one form of device having a pair of arms as above described;

Figure 3 is a side elevation of the device shown in Figure 2;

Figure 4 is a view corresponding to Figure 3, but also showing the mounting on the cross piece of the chassis frame, of a modified form of the invention;

Figure 5 is a front elevation of the device shown in Figure 4, the cross piece of the chassis frame being shown in transverse vertical section;

Figure 6 is a front elevation of a member having a pair of arms constructed according to a third modification of the invention.

In the form shown in Figures 1, 2 and 3, the brake pedal 10, or an equivalent brake controlling device, is or may be mounted on a transmission casing 12 carried by a chassis frame 14 having a cross piece 16 which supports an oscillating member 18. This member has a pair of arms 20 and 22, the arm 20 being swiveled to a block 24 in which is adjustably threaded a connection such as a link 26 held by a check-nut 28, and which is arranged to operate one of the brakes 28 on one of the rear wheels 30. The arm 22 is pivotally connected to an equalizing link shown as comprising a pair of side plates 32, to the opposite end of which is swivelled a bifurcated block 34 in which is adjustably threaded a connection such as a link 36 held by a check-nut 38, and which operates the other brake 28 on the other rear wheel 30. At an intermediate point of the equalizing link a block 40 is swivelled between the plates 32 and a link 42 from the pedal 10, or equivalent brake controlling member, passes through this block and is arranged to be adjusted by turning a wing nut 44.

It will be noted that in the form shown in Figures 1, 2 and 3, the arms 20 and 22 are equal in length and accordingly the link 42 is connected to the equalizing link through the medium of the swivelled block 40 at the center of the equalizing link, so that the ratio of the lengths of those parts of the equalizing link above and below the connection is equal to the ratio of the lengths of the arms 20 and 22, both ratios being in this case equal to one. By this arrangement it will be seen that the pressure applied by the pedal through the link 42 is equalized as between the two brakes.

In the modification shown in Figures 4 and 5, the arms 120 and 122 of member 118, corresponding respectively to the arms 20 and 22 of member 18, are unequal in length, the longer arm 120 being directly connected to one of the brakes through the medium of a swivelled block 124 in the same manner as the arm 20 is connected to its brake. An equalizing link 132 is pivotally connected to the shorter arm 122 and at its opposite end is connected by means of a block 134 and link 136 to the other brake. At an intermediate point a bifurcated block 140 is swivelled to the link 132 and a connection such as a rod 142 is adjustably threaded into this block and held by a check-nut 144.

In this modification it will be observed that the ratio of the length of that part of link 132 which is above the block 140 to the length of that part of link 132 which is below the block 140 is equal to the ratio of the length of the shorter arm 122 to the length of the longer arm 120. By this arrangement, although the arms 120 and 122 are unequal in length, the pressure on the brakes is still equalized. One advantage of this arrangement is that the connections to the two brakes are substantially the same distance below the cross piece 16 of the chassis frame.

The modification shown in Figure 6 differs from that shown in Figures 2 and 3 in that the plates 232 which make up the equalizing link, and which corresponds to the plates 32, are in contact with one another instead of being spaced apart, and instead of using the block 40 and wing nut 44 a block 240 which is bifurcated like the block 140 is used adjustably to receive a link 242 from the pedal or equivalent controlling device. This modification also differs from that shown in Figures 2 and 3 in that the arms 20 and 22 are reversed with respect to one another.

In all three of the modifications the arms 20 and 22, or 120 and 122, as the case may be, are extended upwardly and formed with reduced necks 300 above which are heads 302 received in depressions 304 formed in cross piece 16 of the chassis frame, holes being provided in the bottoms of the depressions through which the necks 300 pass. The heads 302 are shaped in such a manner that they can be passed through these openings by a hooking movement while after the member 18 or 118 has been connected to the pedal and to the brakes it is impossible for the heads to pass back through the openings again.

By the use of such an oscillating member having two parallel vertical arms rigidly connected and each pivotally mounted on a cross frame member, a simple and inexpensive device has been produced and one which has adequate support from lateral movements, and to which an equalizer may be pivotally connected, the oscillating member and equalizer as a unit being readily assembled, affording connecting points for the links to the brake pedal and to the several brakes and avoiding the necessity of additional rock shafts.

While several modifications of my invention have been illustrated and described it is not my intention to limit its scope to those particular modifications or otherwise than by the terms of the appended claims.

I claim:

1. Brake operating mechanism comprising, in combination, brakes, a brake controlling device, an oscillating member having a pair of parallel arms, a connection from one arm to one of the brakes, and an equalizing device pivoted to and lying in the plane of the other arm and connected to another brake and to the brake controlling device.

2. Brake operating mechanism comprising, in combination, brakes, a brake controlling device, an oscillating member having a pair of parallel arms, a connection from one arm to one of the brakes, and an equalizing link pivotally connected at one end to the other arm and located in the plane of said other arm and at its opposite end connected to another brake and at an intermediate point to the brake controlling device.

3. Brake operating mechanism comprising, in combination, brakes, a brake controlling device, an oscillating member having a pair of parallel arms, a connection from one arm to one of the brakes, an equalizing link pivotally connected to the other arm and located in the plane of said other arm, a connection from the opposite end of the link to another brake, and a connection from an intermediate part of the link to the brake controlling device.

4. Brake operating mechanism comprising, in combination, brakes, a brake controlling device, an oscillating member having a pair of arms, a connection from one arm to one of the brakes, an equalzing link pivotally connected to the other arm, a direct connection from the opposite end of the link to another brake, and a connection from an intermediate part of the link to the brake controlling device, the lengths of the parts of the link on opposite sides of the connection to the brake controlling device being in the same ratio as the lengths of said arms.

5. Brake operating mechanism comprising, in combination, brakes, a brake controlling device, an oscillating member having a pair of arms of unequal lengths, a connection from the longer arm to one of the brakes, an equalizing link pivotally connected to the shorter arm, a connection from the opposite end of the link to another brake and a connection from a point at one side of the center of the link to the brake operating device, the ratio of the lengths of those parts of the link on opposite sides of the connection to the brake controlling device being the same as the ratio of the lengths of said arms.

6. Brake operating mechanism comprising, in combination, brakes, a brake controlling device, an oscillating member having a pair of downwardly extending arms of unequal lengths, a connection from the longer arm to one of the brakes, an equalizing link pivotally connected to the shorter arm, a connection from the opposite end of said link to another brake, and a connection from a point above the center of the link to the brake controlling device, the ratio of the length of that part of the link above the connection to the brake controlling device to the length of the link below that connection being equal to the ratio of the length of the shorter arm to the length of the longer arm.

7. Brake controlling mechanism comprising, a chassis frame having a cross piece provided with openings, an oscillating member having a pair of upwardly extending projections formed with heads to be received in said openings in the cross piece of the frame to support said member for oscillation about a transverse horizontal axis, said oscillating member adapted for connection to a plurality of brakes and to a brake controlling device.

8. Brake operating mechanism comprising, a chassis frame having a cross member, a pair of connected vertically extending arms adapted to be connected at their lower ends to the brakes and the brake controlling device and formed at their upper ends with heads received in openings in the cross piece of the frame to support said member for oscillation about a transverse horizontal axis.

9. Brake operating mechanism comprising, a chassis frame having a cross piece formed with a pair of spaced depressions having openings in their bottoms, an intermediate member having a pair of connected brake operating arms which extend upwardly and which are formed at their upper ends with heads received in said depressions and with necks below the heads which pass through said openings, said intermediate member being adapted to be connected to a plurality of brakes and to a brake controlling device.

10. Brake operating mechanism comprising, in combination, brakes, a brake controlling device, an oscillating member having a pair of parallel arms, connections from one of the arms to one of the brakes, an equalizing link pivotally connected to the other arm, a direct connection from the opposite end of the link to another brake, and a connection from the brake controlling device adjustably secured to an intermediate part of said link to permit adjustment of the brake operating connections.

11. Brake operating mechanism comprising, in combination, brakes, a brake controlling device, an oscillating member having a pair of arms, a connection from one arm to one of the brakes, an equalizing link pivotally connected to the other arm, a direct connection from the opposite end of the link to another brake, a block swivelled to an intermediate part of the link, and a connection from the brake controlling device adjustably secured to said block.

12. Brake operating mechanism comprising, in combination, brakes, a brake controlling device, an oscillating member having a pair of arms, an equalizing link pivotally connected to one of said arms and located in the plane of said arm, connections from the brakes adjustably secured to the equalizing link and to the other one of said arms, and a connection from an intermediate part of the link to the brake controlling device.

13. Brake operating mechanism comprising, in combination, brakes, a brake controlling device, an oscillating member having a pair of arms, an equalizing link pivotally connected to one of said arms and located in the lane of said arm, connections from the brakes adjustably secured to the equalizing link and to the other one of said arms, and a connection from the brake controlling device adjustably secured to an intermediate part of the link.

14. Brake operating mechanism comprising brakes, a brake controlling device, an oscillating member, a connection from the oscillating member to one brake, an equalizing link pivoted to the oscillating member located in its plane and in linear extension thereof, a connection from the equalizing link to the second brake, and a connection from the equalizing link to the controlling device, the brake connections to the oscillating member and to the equalizing link being both on the same side of the axis of oscillation of the oscillating member.

In testimony whereof I affix my signature.

ALEX TAUB.